United States Patent
Floeter et al.

(10) Patent No.: US 6,777,018 B2
(45) Date of Patent: Aug. 17, 2004

(54) EDIBLE SPREAD CONTAINING A NATURAL FAT PHASE

(75) Inventors: Eckhard Floeter, Vlaardingen (NL); Henricus Arnoldus Hendrickx, Vlaardingen (NL); Cornelis Willem van Oosten, Vlaardingen (NL); Cornelis Sjouke Stellema, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 234 days.

(21) Appl. No.: 10/045,405

(22) Filed: Nov. 20, 2001

(65) Prior Publication Data

US 2002/0114874 A1 Aug. 22, 2002

(30) Foreign Application Priority Data

Nov. 21, 2000 (EP) ............................................ 00204120
May 21, 2001 (EP) ............................................ 01201916

(51) Int. Cl.[7] ................................................ A23D 7/00
(52) U.S. Cl. ........................ 426/603; 426/603; 426/607
(58) Field of Search ................................ 426/601–604, 426/607

(56) References Cited

U.S. PATENT DOCUMENTS

| 4,348,423 | A | * | 9/1982 | Pairaud et al. .............. 426/607 |
| 4,388,339 | A | * | 6/1983 | Lomneth et al. ............. 426/602 |
| 4,390,561 | A | * | 6/1983 | Blair et al. .................. 426/607 |
| 4,877,636 | A | * | 10/1989 | Koyano et al. .............. 426/607 |
| 4,910,037 | A | * | 3/1990 | Sagi et al. ................... 426/601 |
| 5,424,091 | A | * | 6/1995 | Cain et al. ................... 426/610 |
| 5,679,393 | A | * | 10/1997 | Laur et al. ................... 426/417 |
| 5,786,019 | A |  | 7/1998 | Cain et al. |
| 2002/0114874 | A1 | * | 8/2002 | Floeter et al. ............... 426/602 |
| 2002/0122868 | A1 | * | 9/2002 | Floeter et al. ............... 426/602 |

FOREIGN PATENT DOCUMENTS

| BE | 904 628 | 8/1986 |
| EP | 0 185 524 | 12/1985 |
| EP | 0 294 974 | 5/1988 |
| EP | 0 321 227 | 12/1988 |

OTHER PUBLICATIONS

J. Sci. Fd. Agric. 1977, 28, pp. 384–386; D. Adomako; "Fatty Acid Composition and Characteristics of *Pentadesma butyracea* Fat Extracted from Chana Seeds".

JAOCS. vol. 62, No. 5, May 1985, pp. 910–911; Foma et al., "Kernel Oils of Seven Plant Species of Zaire".

* cited by examiner

*Primary Examiner*—Carolyn Paden
(74) *Attorney, Agent, or Firm*—Milton L. Honig

(57) ABSTRACT

Edible W/O-emulsion spread of which the fat phase comprises a vegetable hardstock fat, which hardstock fat contains at least 5 wt. % of Allanblackia fat and/or Pentadesma fat and which preferably contains at least 45 wt. % of SOS triglycerides (S denotes a fatty acid residue with a saturated C18–C24 carbon chain and O denotes an oleic acid residue).

12 Claims, No Drawings

EDIBLE SPREAD CONTAINING A NATURAL FAT PHASE

The present invention deals with an edible emulsion spread containing a natural fat phase and a process for its preparation.

BACKGROUND AND PRIOR ART

Butter is an edible emulsion spread consisting of a continuous fat phase and an aqueous phase which is dispersed as fine droplets in the fat phase. The fat phase consists of dairy fat, a 100% natural fat. Margarine too is a fat continuous emulsion, but margarine fat is not natural, but has been processed in order to give margarine properties desired for a spread. The fat phase of margarine and of similar fat continuous emulsion spreads is a mixture of a fat which is fully liquid (the oil part of the fat phase) and a fat which is solid at ambient temperature.

The solid fat, denoted as hardstock fat, serves to structure the fat phase and helps to stabilize the emulsion. For imparting to common margarine a semi-solid, plastic, spreadable consistency this stabilizing and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

The technology of spread processing is well established. The type of fat and the ratio of liquid oil and solid fat are chosen such that after proper processing of the fat blend with an aqueous phase a plastic product with a suitable consistency and mouthfeel is obtained.

Vegetable oils are the usual source for preparing margarine fats. Vegetable fats are preferred over animal fats because their unsaturated fat composition enhances the spread's nutritional value. Besides that, vegetable fats are an abundant and relatively cheap resource. However, natural, non-processed vegetable fats which are suited as hardstock fat are rather rare.

Fractionation, hydrogenating and interesterification are the normally used treatments for turning liquid vegetable oils into suitable hardstock fats.

The present trend in food processing is to avoid processing, particularly chemical processing as much as possible and to opt for natural ingredients and natural processing. Natural means that the ingredients have a natural origin and after harvesting have been subjected to no other treatment than a refining or purification treatment and to no modification treatment whatsoever. This trend strongly appeals to present consumer appreciation. It also may contribute to the economy of the production process.

Generally, fats with a high content of HUH triglycerides show good structuring properties. H denotes a C16–C24 saturated fatty acid residue, such as palmitic acid (C16) or stearic acid (C18) and U denotes an unsaturated C18 fatty acid residue, such as oleic acid (C18:1) or linoleic acid (C18:2).

Cacao butter is the only unprocessed fat which contains a high amount of HUH triglycerides and which has been used for margarine production. However, a spread prepared with cacao butter as hardstock fat shows defects of which the most serious is that during storage fat grains are formed which presence imparts to the spread a gritty mouthfeel. It has been found that the high content of palmitic acid in the hardstock fat is the cause of this phenomenon.

Besides that, cacao butter is generally too expensive to serve as hardstock fat in margarine manufacture.

Shea fat, also having a high content of HUH triglycerides, needs to be fractionated before use, because it contains up to 10 wt. % of non-saponifiable matter. The stearin contains 73 wt. % of HUH where nearly all H are stearic acid residues and nearly all U are oleic acid residues. The high costs of fractionation are prohibitive for the commercial use of shea stearin in spread manufacture.

Natural, non-processed hardstock fats with a high content of HUH in which H mainly is a stearic acid residue are still much sought ingredients for the manufacture of emulsion spreads with a wholly natural fat phase.

The present invention satisfies the need of a natural non-processed hardstock fat with such triglyceride content.

SUMMARY OF THE INVENTION

The present invention is based on the discovery of vegetable fats which have such beneficial triglyceride composition that they can be used as such as a natural hardstock fat for spread manufacture. Besides refining, the fat does not need any modification. The fats are known under the names Allanblackia fat and Pentadesma fat. They contain a high StOSt content: 65 wt. % StOSt for the Allanblackia fat and 48 wt. % StOSt for the Pentadesma fat, where St is a stearic acid residue and O is an oleic acid residue.

The present invention provides an edible W/O emulsion spread comprising 70–20 wt. % of an aqueous phase which is dispersed in 30–80 wt. % of a fat phase which is a mixture of 50–99 wt. % of a vegetable oil and 1–50 wt. % of a vegetable hardstock fat, characterized in that at least 5 wt. %, preferably at least 50 wt. % of the hardstock fat is either Allanblackia fat or Pentadesma fat or a mixture of both.

The invention further provides a process for the preparation of an edible W/O emulsion spread comprising the steps:

emulsifying 70–20 wt. % of an aqueous phase with 30–80 wt. % of a fat phase which fat phase comprises a liquid oil and a vegetable hardstock fat and cooling and working the emulsion to obtain a spreadable emulsion, characterized in that at least 5 wt. %, preferably at least 50 wt. % of the hardstock fat is either Allanblackia fat or Pentadesma fat or a mixture of both.

DETAILS OF THE INVENTION

The present invention relates to edible emulsion spreads, particularly to fat continuous emulsion spreads such as margarine. The invention can be generally used for the manufacture of common fat continuous spreads irrespective of their fat content.

Allanblackia fat is also denoted with a variety of indigenous names such as Sonkyi fat. It is harvested from the African plant Allanblackia of which several species such as *A. floribunda* and *A. stuhlmannii* are known. Allanblackia belongs to the subfamily Clusioideae, which is part of the family Guttiferae. All species share a substantially common fatty acids pattern and triglyceride composition. Allanblackia fat had found some early employment as an ingredient in chocolate manufacture (EP 321227) and in the soap industry (J. Am. Oil Chem. Soc., 62, no.5, 1985, pp.910–911), but it has never been considered for use in the manufacture of fat continuous emulsion spreads.

Pentadesma fat also is obtained from an African plant, the tree Pentadesma butyracea. The suggested use of the oil is for soap manufacture. It has never been considered as an ingredient for margarine manufacture.

We have found that Allanblackia fat, with a high (60–80 wt. %) content of SOS triglycerides, a low SSS content and the remainder of the fat mainly consisting of SOO, is an ideal hardstock fat for margarine manufacture. S denotes a fatty acid residue with a saturated C18–C24 carbon chain and O denotes an oleic acid residue.

After refining no modification processing is necessary. By admixture with a liquid oil a fat phase is obtained which shows the steep melting curve desired for margarine fat. A spread prepared with such fat phase preserves its solid consistency in the range of refrigerator temperature up to ambient or even slightly elevated temperatures, while when swallowed it gives a pleasant quick melting sensation in the mouth.

With a content of 48 wt. % SOS also Pentadesma fat without modification is suitable to be used as a hardstock fat.

A natural fat containing at least 45 wt. % of SOS triglycerides is a much desired hardstock fat. Until now no method is known for realizing a production of such fats without a modification treatment. Fractionation was inevitable in order to increase the SOS content.

Although Allanblackia fat and Pentadesma fat after harvesting and purification are ready for use as natural hardstock fat, optionally, they are used in fractionated form as an olein or stearin fraction.

They may suitably be used in admixture with other fats provided at least 5 wt. % of the blend consist of either Allanblackia fat or Pentadesma fat or a mixture of both, where the use of fractions of those fats is allowed. However, preferably all fats of the blend are natural.

Preferably at least 45 wt. % and more preferably at least 50 wt. % of the hardstock fat triglycerides consist of SOS triglycerides.

When 100% of the fat blend consist of unfractionated Allanblackia fat and/or Pentadesma fat or a fraction obtained by a natural (dry) fractionation process the hardstock can serve as a natural hardstock.

The liquid oil of the fat phase may be any liquid vegetable oil and suitably it is prepared with one or more of the common commodity oils chosen from the group consisting of: rapeseed oil, sunflower oil, cottonseed oil, soybean oil, olive oil and mixtures of those oils.

Natural refining processes are readily available.

Generally, a blending ratio of 30 wt. % of hardstock fat and 70 wt. % of liquid oil affords a suitable margarine fat phase. A fat phase when prepared for example with 30 wt. % unprocessed Allanblackia fat and 70 wt. % rapeseed oil contains only 22 wt. % (on fat phase) saturated fatty acids (SAFA) which is a fine value from a nutritional point of view.

A proper amount of hardstock fat depends on the type of spread. The composition of a wrapper margarine requires more solid fat than that of a tub margarine to obtain the desired consistency. On the other side relativly more hardstock is necessary when it contains relatively little structuring triglycerides such as StOSt.

Although the spreads of the invention are said to be prepared with a vegetable fat phase, the invention also comprises spreads where a part of the fat phase has been substituted by dairy fat.

The aqueous phase may contain the usual spread ingredients such as water, one or more emulsifiers, gelling and/or thickening agents, salt, colouring agent, flavour, a preservation agent and dairy proteins.

The aqueous phase may also contain a dispersed fat phase so that eventually an O/W/O-emulsion would result which is a subspecies of the spreads according to the present invention.

For the preparation of the spread use is made of common spread manufacturing technology:

The aqueous phase and the fat phase are prepared by mixing the respective ingredients. Then both phases are emulsified. The crude pre-emulsion is subjected to the usual cooling and working treatments employing scraped surface heat exchangers and pin stirrers so that eventually a plastic spread product is obtained.

This is established technology which is well known to the man skilled in the art. Details can be found in various textbooks such as K. A. Alexandersen, Margarine Processing Plants and Equipment (Vol.4, Bailey's Industrial Oil and Fat Products, Wiley and Sons Inc., New York 1996).

Preferably the invented spread is prepared with only natural ingredients.

EXAMPLE

Allanblackia floribunda fat was purified under standard refining conditions.

A spread according to the invention was prepared using the fat blend of Table 1 for preparing a pre-emulsion according to Table 2. The pre-emulsion was processed in a A-A-C line under the conditions listed in Table 3.

An assay of the resulting spread is shown in Table 4.

The product is easily spreadable from the refrigerator. The spread shows a steep melting line which causes a very pleasant mouthfeel. The hardness values point to good ambient stability.

TABLE 1

|  | % |
| --- | --- |
| Fat blend | |
| Rapeseed oil | 70 |
| Allanblackia | 30 |
| SOS | 21 |
| SOO | 12 |
| SOS/SLS | 78 |
| total SAFA | 22 |
| Solid fat | |
| N5 | 24.5 |
| N10 | 22.4 |
| N15 | 20 |
| N20 | 16 |
| N25 | 11.4 |
| N30 | 5.3 |
| N35 | 0 |

TABLE 2

| Pre-emulsion | wt. % |
| --- | --- |
| Fat blend | 80 |
| Bolec ZT | 0.32 |
| Hymono 8903 | 0.035 |
| Flavour | trace |
| B-carotene | 0.048 |
| Water | 18.6 |
| K-sorbate | 0.073 |
| Whey protein | 0.55 |
| Salt | 0.28 |
| Citric acid | 0.05 |
| End pH | 4.6 |

TABLE 3

Process settings:
Premix 60° C., pump 4.45 kg/h, pressure 8 bar

|  |  | A-unit 1 | A-unit 2 | C-unit |
|---|---|---|---|---|
| Temp in | ° C. | 44 | 17 | 12 |
| Temp out | ° C. | 17 | 12 | 14 |
| Volume | ml | 18.3 | 18.3 | 150 |
| rpm | /min | 600 | 600 | 200 | direct storage: 15° and 5° C.

TABLE 4

Stevens 4.4 hardness (g) of spread

| C. | 1 week | 2 weeks | 4 weeks | 9 weeks |
|---|---|---|---|---|
| 5° | 70 | 67 | 60 | 56 |
| 15° | 62 | 70 | 86 | 94 |
| 20° | 60 | 76 | 82 |  |

What is claimed is:

1. An edible W/O emulsion spread comprising 70–20 wt. % of an aqueous phase which is dispersed in 30–80 wt. % of a fat phase which is a mixture of 50–99 wt. % of a vegetable oil and 1–50 wt. % of a vegetable hardstock fat, where at least 5 wt. % of the hardstock fat is either Allanblackia fat or Pentadesma fat or a mixture of both.

2. A spread according to claim 1, where the hardstock fat consists of either Allanblackia fat or Pentadesma fat or a mixture of both.

3. A spread according to claim 1, where at least 45 wt. % of the hardstock fat triglycerides consist of SOS triglycerides and where S denotes a fatty acid residue with a saturated C18–C24 carbon chain and O denotes an oleic acid residue.

4. A spread according to claim 1, where at least 50 wt. % of the hardstock fat triglycerides consist of SOS triglycerides and where S denotes a fatty acid residue with a saturated C18–C24 carbon chain and O denotes an oleic acid residue.

5. A spread according to claim 1, where the hardstock fat comprises a stearin or olein fraction of Allanbiackia fat or Pentadesma fat.

6. An edible W/O emulsion spread according to claim 1, wherein about 100% of the Allanbiackia fat or Pentadesma fat is unfractionated.

7. An edible W/O emulsion spread according to claim 1, wherein the hardstock fat is Allanbiackia fat.

8. An edible W/O emulsion spread according to claim 1, wherein the hardstock fat comprises Pentadesma fat.

9. An edible W/O emulsion spread comprising 70–20 wt. % of an aqueous phase which is dispersed in 30–80 wt. % of a fat phase which is a mixture of 50–99 wt. % of a vegetable oil and 1–50 wt. % of a vegetable hardstock fat, where at least 50 wt. % of the hardstock fat is either Allanblackia fat or Pentadesma fat or a mixture of both.

10. A process for the preparation of an edible W/O emulsion spread comprising the steps emulsifying 70–20 wt. % of an aqueous phase with 30–80 wt. % of a fat phase which fat phase comprises a liquid oil and a vegetable hardstock fat and cooling and working the emulsion to obtain a spreadable emulsion, where a hardstock fat is used of which at least 5 wt. % is either Allanblackia fat or Pentadesma fat or a mixture of both.

11. A process according to claim 10, where a hardstock fat is used of which at least 45 wt. % of the triglycerides of the hardstock fat consist of SOS triglycerides.

12. A process according to claim 10, where a hardstock fat is used which comprises an olein or stearin fraction of Allanblackia fat or Pentadesma fat.

* * * * *